(12) United States Patent
Galazin et al.

(10) Patent No.: US 7,484,744 B2
(45) Date of Patent: Feb. 3, 2009

(54) TRAILING ARM SUSPENSION WITH OPTIMIZED I-BEAM

(75) Inventors: Greg Galazin, Muskegon, MI (US); Dan Dykstra, Grand Rapids, MI (US)

(73) Assignee: SAF-Holland, Inc., Holland, MI (US)

( * ) Notice: Subject to any disclaimer, the term of this patent is extended or adjusted under 35 U.S.C. 154(b) by 363 days.

(21) Appl. No.: 10/800,953

(22) Filed: Mar. 15, 2004

(65) Prior Publication Data

US 2004/0183271 A1  Sep. 23, 2004

Related U.S. Application Data

(60) Provisional application No. 60/455,946, filed on Mar. 19, 2003, provisional application No. 60/353,629, filed on Feb. 1, 2002.

(51) Int. Cl.
*B60G 9/00* (2006.01)

(52) U.S. Cl. .................. 280/124.116; 280/124.157; 384/295

(58) Field of Classification Search ............ 180/124.11, 180/124.116, 124.128, 124.13, 124.153, 180/124.157, 86.5, 683, 124.177; 384/428, 384/439, 295
See application file for complete search history.

(56) References Cited

U.S. PATENT DOCUMENTS

| | | | | |
|---|---|---|---|---|
| 1,679,941 A | * | 8/1928 | Morris ...................... | 384/298 |
| 3,107,951 A | * | 10/1963 | Palm .......................... | 384/153 |
| 3,332,701 A | * | 7/1967 | Masser ................ | 280/124.116 |
| 3,904,300 A | * | 9/1975 | Hetmann .................... | 403/203 |
| 4,415,179 A | * | 11/1983 | Marinelli ............. | 280/124.116 |
| 4,858,949 A | * | 8/1989 | Wallace et al. ........ | 280/124.116 |

(Continued)

OTHER PUBLICATIONS

Neway Parts Catalog, Truck/Tractor and Trailer Suspension Components, 1997, pp. 2-22, 2-66, 2-88, 2-90, 2-98, 2-116.

*Primary Examiner*—Eric Culbreth
(74) *Attorney, Agent, or Firm*—Price, Heneveld, Cooper, DeWitt & Litton, LLP

(57) ABSTRACT

A suspension system for suspending a vehicle frame above a plurality of ground-engaging wheels includes a wheel-carrying axle comprising a first end a second end, and a pair of frame bracket assemblies each comprising a resiliently-bushed pivotable connection defining a pivot axis, wherein the frame bracket assemblies are operably coupled to opposite sides of the frame bracket, and wherein the resiliently-bushed pivotable connection comprises a substantially cylindrically-shaped bushing. The suspension system also includes a pair of trailing arms each comprising a first end operably coupled to the first end and the second end of the axle, respectively, and a second end comprising an aperture that receives the bushing of one of the frame bracket assemblies therein, wherein the aperture of the second end of each trailing arm is nonsymmetrical, thereby causing a nonsymmetrical compression of the bushing about the pivot axis. The suspension system also includes embodiments wherein the aperture of the second end of each trailing arm is nonuniform, thereby reducing rotation of the bushing with respect to the trailing arm, wherein a mating surface of each trailing arm operably coupled to the first and second end of the axle comprise a cavity, thereby reducing a localized stress transferred from the trailing arm to the axle, wherein the second end of each trailing arm further comprises a lip extending radially outward from the aperture and at least one engagement surface extending radially outward from the lip and adapted to abut a bushing-removal tool, as well as other improvements.

19 Claims, 7 Drawing Sheets

U.S. PATENT DOCUMENTS

| | | | |
|---|---|---|---|
| 5,203,585 A * | 4/1993 | Pierce | 280/124.116 |
| 5,238,262 A * | 8/1993 | Nunes | 280/681 |
| 5,275,429 A * | 1/1994 | Bunker | 280/124.177 |
| 5,366,237 A * | 11/1994 | Dilling et al. | 280/124.116 |
| 5,413,374 A * | 5/1995 | Pierce | 280/124.177 |
| 5,836,698 A * | 11/1998 | Richardson | 384/29 |
| 5,988,672 A * | 11/1999 | VanDenberg | 280/683 |
| 6,241,266 B1 * | 6/2001 | Smith et al. | 280/124.116 |
| 6,508,482 B2 * | 1/2003 | Pierce et al. | 280/124.116 |
| 6,550,795 B1 * | 4/2003 | Schlosser et al. | 280/86.75 |
| 6,827,360 B2 * | 12/2004 | Chan et al. | 280/124.116 |
| 7,048,288 B2 * | 5/2006 | Chan et al. | 280/124.116 |
| 2002/0130480 A1 * | 9/2002 | VanDenberg | 280/124.116 |
| 2004/0056446 A1 * | 3/2004 | Dudding et al. | 280/124.128 |
| 2006/0033304 A1 * | 2/2006 | Saieg et al. | 280/124.128 |

\* cited by examiner

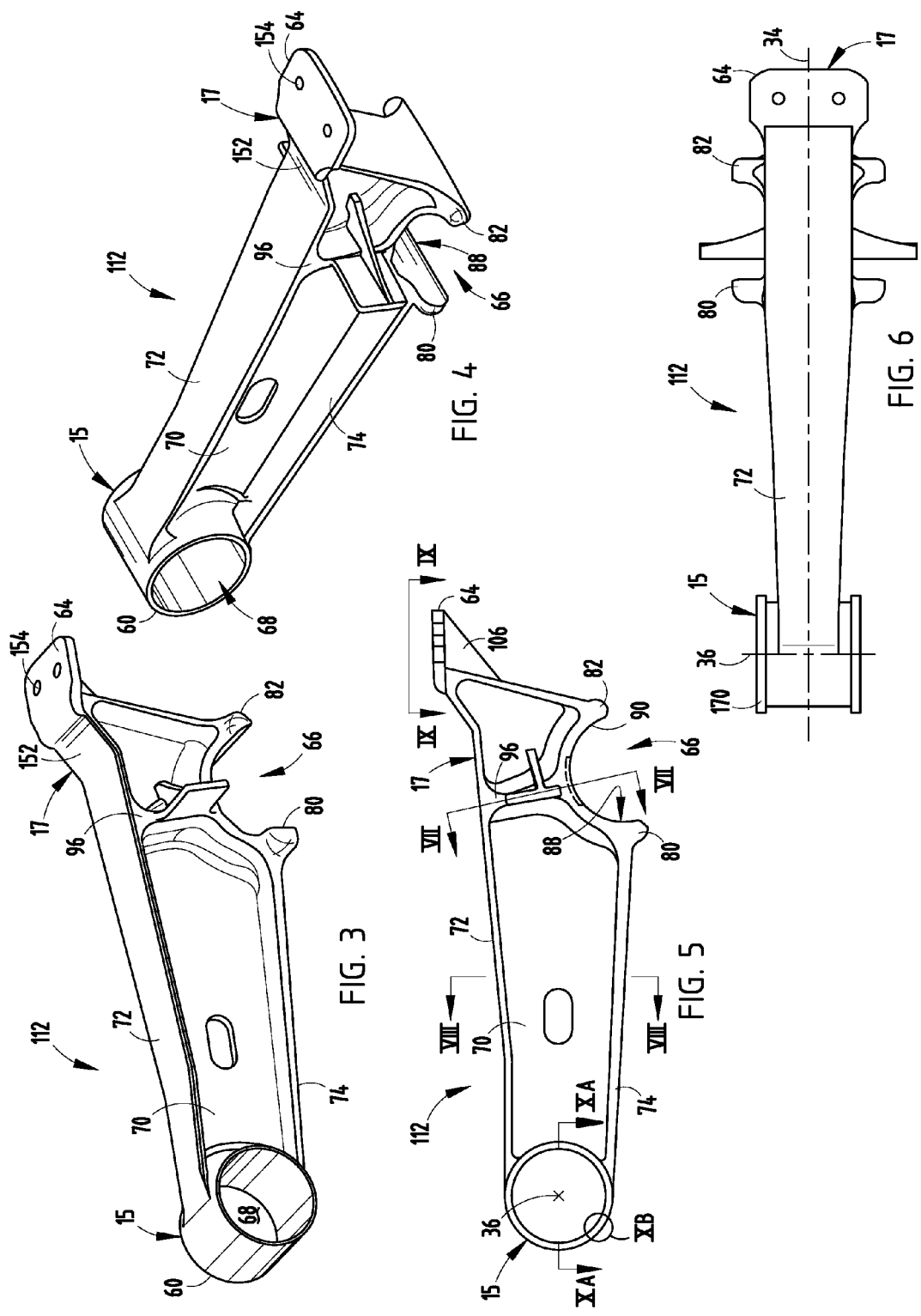

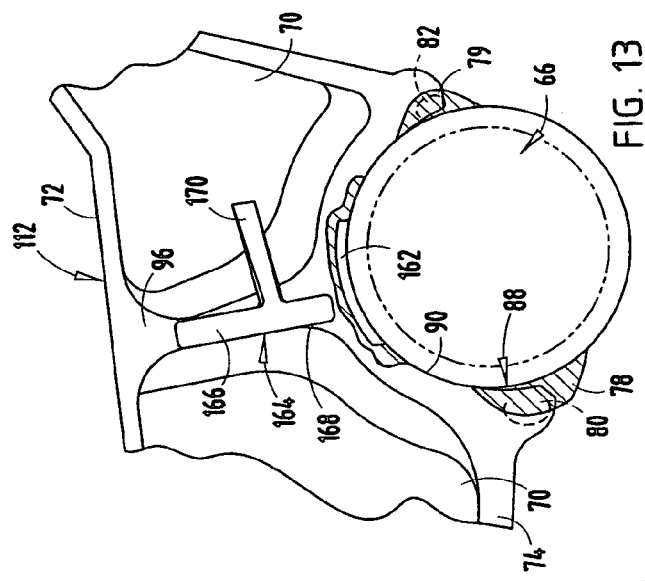
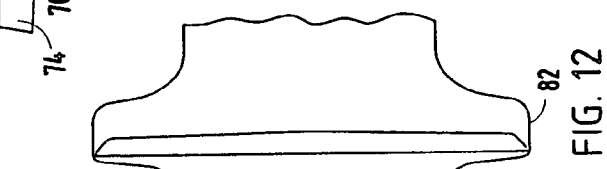
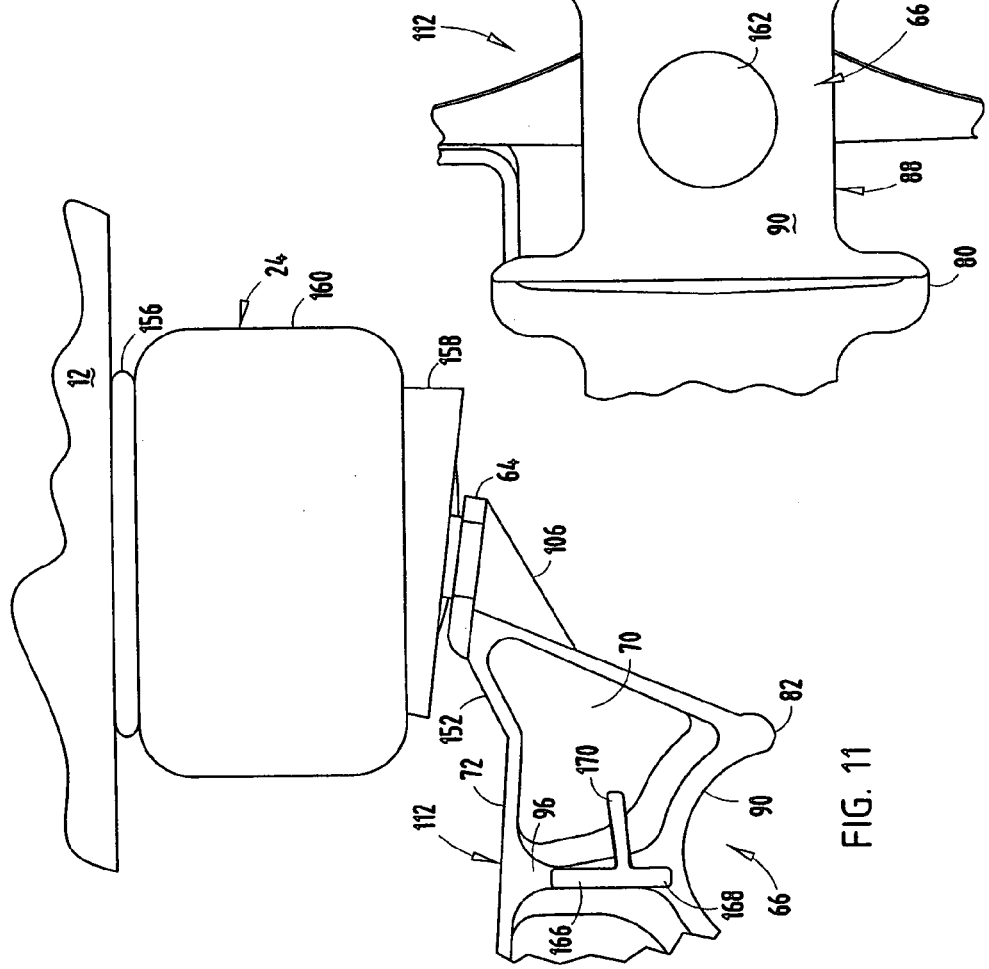

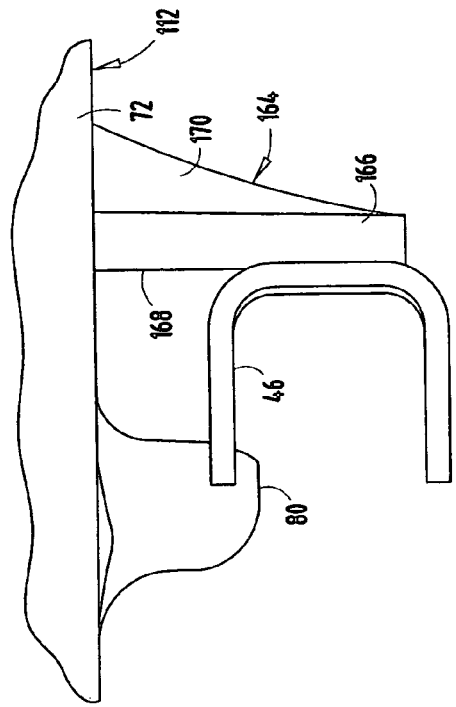
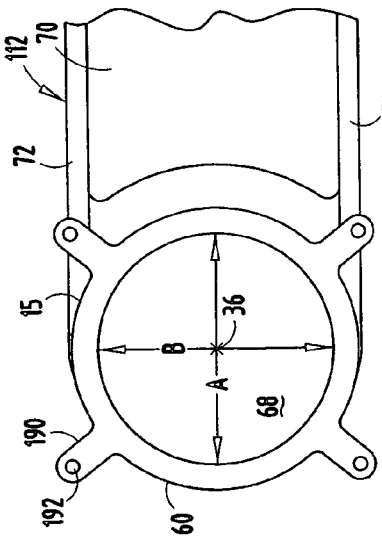
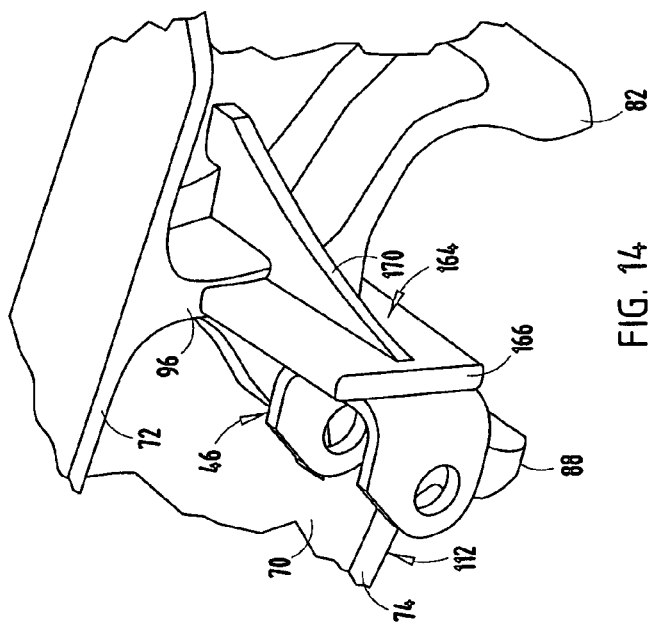

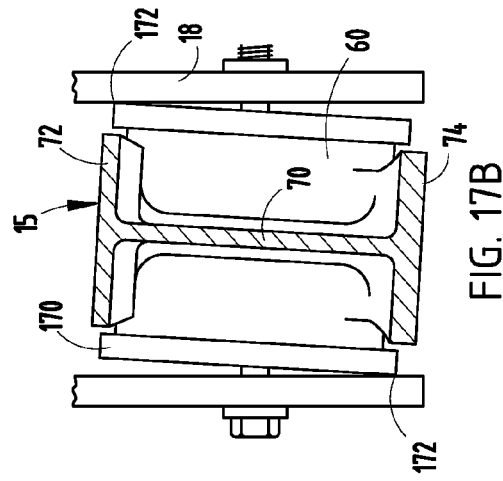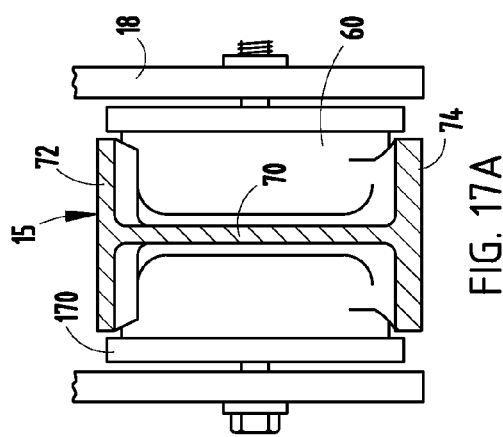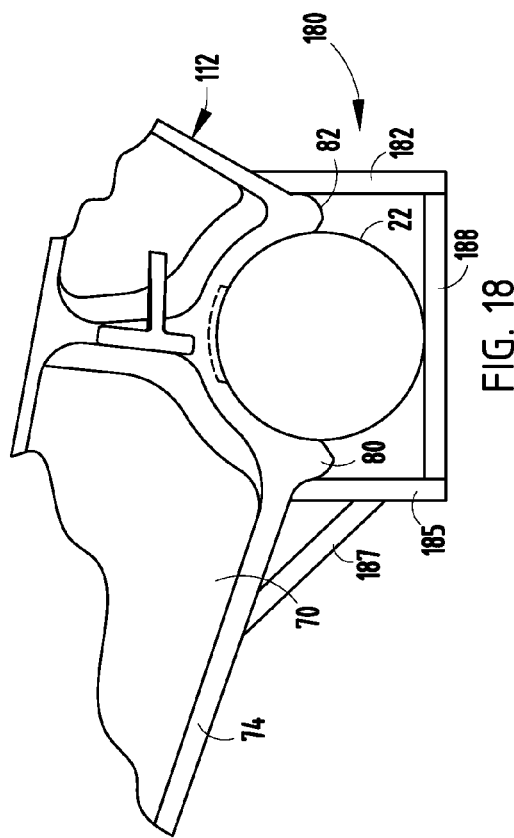

TRAILING ARM SUSPENSION WITH OPTIMIZED I-BEAM

CROSS-REFERENCE TO RELATED APPLICATION

This application claims the benefit of U.S. Provisional Application No. 60/455,946, filed Mar. 19, 2003, entitled TRAILING ARM SUSPENSION WITH OPTIMIZED I-BEAM, and of PCT Patent Application No. PCT/US/ 03010, filed Jan. 31, 2003. entitled TRAILING ARM SUSPENSION WITH OPTIMIZED I-BEAM, which claims priority from U.S. Provisional Patent Application No. 60/353, 629, filed Feb. 1, 2002, entitled TRAILING ARM SUSPENSION WITH OPTIMIZED I-BEAM, which is hereby incorporated herein by reference in its entirety.

BACKGROUND OF THE INVENTION

1. Field of the Invention

The invention relates to vehicle suspension systems, and in particular to suspensions for semi tractor-trails incorporating single-piece, cast trailing arms.

2. Description of the Related Art

Trailing beam suspensions for semi tractor-trailer combinations are well-known in the trucking industry. The typical trailing beam suspension comprises a hanger bracket suspended from a trailer frame rail. A trailing beam or arm is pivotably connected at one end to the hanger bracket to enable the trailing beam to pivot about a horizontal axis. The pivotable connection may comprise a resiliently bushed connection. The free end of the trailing beam is attached to a spring that is, in turn, attached to the trailer frame rail for cushioning the ride. The spring can comprise a mechanical spring, such as a coil spring, or an air spring. An axle is attached transversely to a pair of trailing beams on either side of the trailer through a rigid or resilient axle-to-beam connection. Other suspension and braking components can be attached to the trailing beam and/or the axle, such as a brake assembly, track bars, and shock absorbers.

Trailing beams can take a variety of shapes and cross sections, and are typically fabricated by welding individual components into the final assembly, thereby providing a beam with a hollow cross section. An example of such a beam is disclosed in U.S. Pat. No. 5,366,237 to Dilling et al. Such beams are typically designed for the maximum stress to which the beam will be subjected at any point on the beam. This approach results in sections of the beam having more material than is necessary for the maximum stress imposed on the beam at that section. This excess material adds to the cost and weight of the beam. Moreover, the welds induce stresses into the beam that can contribute to premature failure of the beam. Weld-induced stresses can be minimized by laying down welds that are of a consistent thickness. However, such detailed welding techniques can also increase the cost of fabrication and the weight.

Attachment of the axle to the beam is typically through some type of welded connection, such as disclosed in U.S. Pat. No. 5,366,237 to Dilling et al. Welded connections can induce in the axle stresses and cracks that can contribute to premature failure of the axle. Weld-induced axle stresses can be minimized by limiting the welded area to the region around the axle's neutral axis, and by starting and ending the weld at the same point on the axle. Moreover, the extent and location of the weld can preclude separation of the axle from the beam, which would be desirable in order to replace a damaged axle or beam without replacing the entire suspension.

Heretofore, resilient bushings have been utilized within the pivotable connection between the beam and the associated hanger bracket. It is also known to use bushings that have apertures extending along the length thereof to alter the spring-rate of the bushing along a particular path. Typically, these apertures are provided in pairs juxtaposed across the bushing. The bushing is then placed within the associated beam with the apertures vertically oriented, thereby altering the spring rate of the bushing for lateral shift of the trailer as compared to the spring rate for the bushing for roll of the trailer. In operation, these bushings are fixed with respect to the beams and pivot about pivot pins that are fixed with respect to the associated hanger brackets. However, these bushings can sometimes rotate with respect to the beam rather than the hanger bracket, thereby changing the orientation of the busing, and the orientation of the apertures located therein, and changing the direction in which the bushing affords a reduction in the spring-rate.

In previously known systems, significant wear of the trailing arms may occur proximate the hanger brackets during operation of the associated suspension system. Specifically, in many systems the roll of the vehicle causes the beams to shift within and contact the respective hanger brackets in a location about the periphery of the aperture of each beam within which the bushing are located. These areas about the aperture are typically constructed as thin as possible in an attempt to reduce the overall weight of each beam. The contact between the beams and hanger bracket causes excessive wear requiring the replacement of the beams to avoid catastrophic failure of the beams and/or bushings.

As discussed above, it is known to utilize bushings within the pivotable connection between the beams and hanger brackets, wherein the bushings include apertures extending through the bushings and oriented so as to alter the spring rate in a particular direction of compression while not effecting the spring-rate in others. However, the construction of these specialized bushings is more expensive than bushings that do not include such apertures. Moreover, the specialized bushings require proper orientation of the bushings with respect to the beams at all time, as discussed above.

Heretofore, maintenance of bushings associated with the pivotable connection between the beams and hanger brackets, i.e., the removal of the bushings from within the beams, has required the use of a specialized tool that abuts or engages the area of the beam near the bushing receiving aperture during extraction or installation of the bushing. As discussed above, these areas are typically quite thin in an effort to reduce the overall weight of each beam, thus providing only small areas for abutment of the tool.

During operation of the associated suspension system, bending stress are exerted on the axles, with localized points of stress being exerted at the locations of the connection between the trailing arms and the axles, thereby contributing to excessive stress on the axles and decreasing the useful life of the axles. Normal operation of the suspension system also leads to wear of the boot of the air spring each time the boot is allowed to contact the associated beam. This wear of the boot is especially prevalent during times of loading/unloading when air is not being supplied to the air springs.

Another cause of significant stress within previously known beam configurations, is the concentration of the upwardly directed load bear force exerted by the axle on the beam, and the downwardly directed forces exerted on the ends of the beam by the hanger bracket and air spring. This bending of the each beam results in a compressive force being exerted on the axle and the connection between the beams and the axle.

A configuration for a trailing arm or beam is desired that increases the lifespan of the beam within normal operating conditions, results in a beam having reduced weight while simultaneously providing increased structural integrity and a reduction to production and operating costs.

SUMMARY OF THE INVENTION

One aspect of the present invention is to provide a suspension system for suspending a vehicle frame above a plurality of ground engaging wheels that includes a wheel-carrying axle comprising a first end and a second end, and a pair of frame bracket assemblies each comprising a resilient-bushed pivotable connection defining a pivot axis, wherein the frame bracket assemblies are operably coupled to opposite sides of the vehicle frame, and wherein the resiliently-bushed pivotable connection comprises a substantially cylindrically shaped bushing. The suspension system also includes a pair of trailing arms each comprising a first end operably coupled to the first end and the second end of the axle, respectively, and a second end comprising an aperture that receives the bushing of one of the frame bracket assemblies therein, wherein the aperture of the second end of each trailing arm is nonsymmetrical, thereby causing a nonsymmetrical compression of the bushing about the pivot axis.

Another aspect of the present invention is to provide a suspension system for suspending a vehicle frame above a plurality of ground-engaging wheels that includes a wheel-carrying axle comprising a first end and a second end, and a pair of frame bracket assemblies each comprising a resiliently-bushed pivotable connection, wherein the frame bracket assemblies are operably coupled to opposite ends of the vehicle frame, and wherein the resilient-bushed pivotable connection comprises an elastically-deformable bushing. The suspension system also includes a pair of trailing arms each comprising a first end operable coupled to the first end and the second end of the axle, respectively, and a second end comprising an aperture that receives the bushing of one of the frame bracket assemblies therein, wherein the aperture defines an inner surface, and wherein the inner surface is nonuniform, thereby reducing a rotation of the bushing with respect to the trailing arm.

Yet another aspect of the present invention is to provide a suspension system for suspending a vehicle above a plurality of ground-engaging wheels that includes a wheel-carrying axle comprising a first end and a second end, and a pair of frame bracket assemblies each comprising a frame bracket and a resilient-bushed pivotable connection, wherein the frame bracket assemblies are operably coupled to opposite sides of the vehicle frame. The suspension system also includes a pair of trailing arms each comprising a first end operably coupled to the first end and the second end of the axle, respectively, and a second end comprising an aperture that receives the resilient-bushed pivotable connection of one of the frame bracket assemblies therein, wherein the second end of each trailing arm comprises a first thickness across a width thereof and a second thickness located proximate the frame bracket that is greater than the first thickness.

Still yet another aspect of the present invention is to provide a suspension system for suspending a vehicle frame above a plurality of ground-engaging wheels that includes a wheel-carrying axle comprising a first end and a second end, and a pair of frame bracket assemblies each comprising a resilient-bushed pivotable connection, wherein the frame bracket assemblies are operably coupled to opposite sides of the vehicle frame, and wherein the resiliently-bushed pivotable connection comprises an elastically deformable bushing. The suspension system also includes a pair of trailing arms each comprising a first end comprising a mating surface operably coupled to the first end and the second end of the axle, respectively, and a second end comprising an aperture that receives the resilient-bushed pivotable connection of the frame bracket assemblies therein, wherein the mating surface of the first end of each of the trailing arms comprises a cavity, thereby reducing a localized stress transferred from the trailing arms to the axle.

Another aspect of the present invention is to provide a suspension system for suspending a vehicle frame above a plurality of ground-engaging wheels that includes a wheel-carrying axle and comprising a first end and a second end, and a pair of frame bracket assemblies each comprising a resiliently-bushed pivotable connection defining a pivot axis, wherein the frame bracket assemblies are operably coupled to opposite sides of the vehicle frame, and wherein the resilient-bushed pivotable connection comprises a substantially cylindrically-shaped bushing. The suspension system also includes a pair of trailing arms each comprising a first end operable coupled to the first end and the second end of the axle, respectively, and a second end comprising an aperture that receives the bushing of one of the frame bracket assemblies, wherein the second end of each trailing arm further comprises a lip extending radially outward from the aperture and at least one engagement surface extending radially outward from the lip and adapted to abut a bushing-removal tool.

Still yet another aspect of the present invention is to provide a suspension system for suspending a vehicle frame above a plurality of ground-engaging wheels that includes a wheel-carrying axle, comprising a first end and a second end, a pair of frame bracket assemblies operable coupled to opposite sides of the vehicle frame, and a pair of shock absorbers each comprising a first end operably coupled to the vehicle frame and a second end. The suspension system also includes a pair of trailing arms each comprising a first end operably coupled to the first end and the second end of the axle, respectively, a second end operable coupled to one of the frame bracket assemblies, and an outwardly extending shock support tang operably coupled to one of the shock absorbers, wherein each of the trailing arms comprises a single-cast piece.

Still yet another aspect of the present invention is to provide a suspension system for suspending a vehicle frame above a plurality of ground-engaging wheels that includes a wheel-carrying axle comprising a first end and a second end, a pair of frame bracket assemblies operably coupled to opposite sides of the vehicle frame, and a pair of air springs each comprising a flexible boot. The suspension system also includes a pair of trailing arms each comprising a first end operably coupled to the first end and the second end of the axle, respectively, a second end operably coupled to one of the frame bracket assemblies, and a top surface comprising a first portion and a second portion, wherein the second portion is adapted to support one of the air springs thereon, and wherein the second portion extends above the first portion, thereby substantially reducing an amount of contact between the trailing arm and the boot of the air spring when the air spring is in a deflated condition.

Still yet another aspect of the present invention is to provide a suspension system for suspending a vehicle frame above a plurality of ground-engaging wheels that includes a wheel-carrying axle comprising a first end and a second end, and a pair of frame bracket assemblies operably coupled to opposites sides of the vehicle frame. The suspension system also includes a pair of trailing arms each comprising a first end operably coupled to the first end and the second end of the axle, respectively, and a second end operably coupled to one of the frame bracket assemblies, wherein the first end of each trailing arm comprises a tube-shaped portion having a slot extending along the length thereof for receiving the axle therein during assembly. The suspension system further includes a pair of spacer assemblies each operably coupled with the trailing arms and spanning the slot of the first end, thereby reducing an amount of flexure of each trailing arm proximate the coupling between the trailing arm and the axle.

The present inventive trailing arm and associated suspension system results in an increased operational lifespan for the associated system, reduces the overall weight, while simultaneously providing increased structural integrity and reducing production and operation costs. The trailing arm disclosed herein is more durable, more wear resistant, efficient in use, and is particularly well adapted for the proposed use.

BRIEF DESCRIPTION OF THE DRAWINGS

FIG. 3 is a top perspective view of an I-beam trailing arm;

FIG. 4 is a second top perspective view of the trailing arm;

FIG. 5 is a side elevational view of the trailing arm;

FIG. 6 is a top plan view of the trailing arm;

FIG. 11 is a side view of an assembly of the trailing arm and an air spring;

FIG. 12 is an enlarged bottom view of an axle seat of the trailing arm;

FIG. 13 is a side view of an assembly of the axle seat and an axle showing a portion of the welds used to connect the axle to the trailing arm;

FIG. 14 is an enlarged perspective view of a shock absorber supporting tang of the trailing arm;

FIG. 15 is an top perspective view of the shock absorber supporting tang of the trailing arm;

FIG. 16 is an enlarged side view of a proximate end of the trailing arm;

FIG. 17A is a cross-sectional view of the trailing arm assembled with the hanger bracket, wherein the cross section of the trailing arm is taken along line XIII-XIII, FIG. 5, and wherein the trailing arm is in a non-deflectional position;

FIG. 17B is a cross-sectional view of the trailing arm assembly with the hanger bracket, wherein the cross section of the trailing arm is taken along line XIII-XIII, FIG. 5, and wherein the trailing arm is in a deflected position; and FIG. 18 is an enlarged side view of a spacer assembly as connected with the trailing arm.

DETAILED DESCRIPTION OF THE PREFERRED EMBODIMENTS

Figure 1:
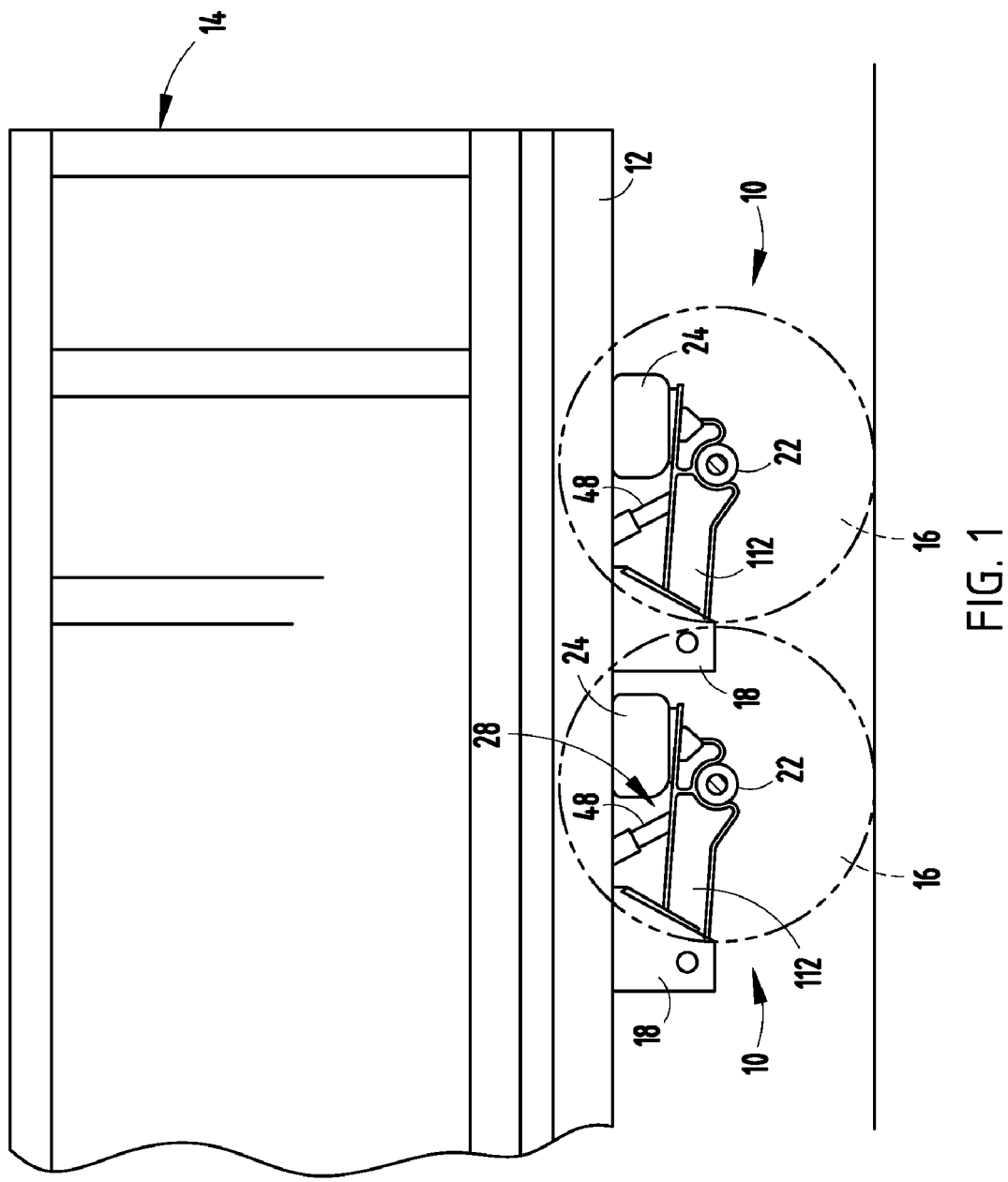
FIG. 1 is an elevational view from the side of a portion of a trailer having a suspension assembly according to the invention.
Figure 2:
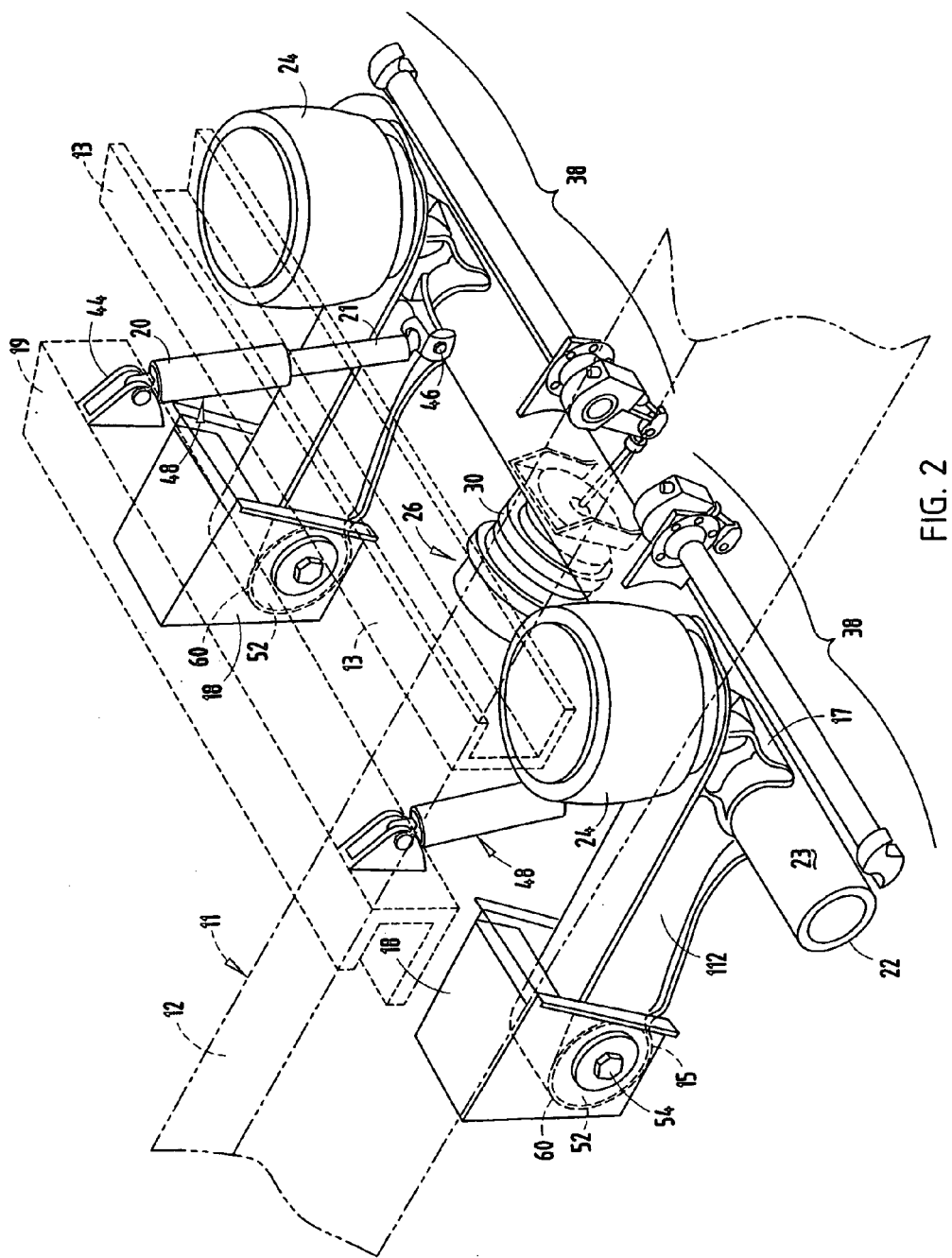
FIG. 2 is a top perspective view of the suspension assembly.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1 and 2, a trailing arm suspension assembly 10 according to the invention is shown suspended from a trailer frame 11, including a trailer frame rail 12, a first crossbeam 13 (shown in outline) and a second crossbeam 19 (shown in outline), and which supports a trailer 14. Two identical suspension assemblies 10 are mounted in tandem to the trailer frame rail 12 for supporting the trailer 14 on two sets of wheels 16. The suspension assembly 10 comprises an improved trailing arm or beam 112 suspended at a proximal end 15 from the trailer frame rail 12 through a hanger bracket 18. A conventional air spring 24 is attached to a distal end 17 of the trailing arm 112 and to the trailer frame rail 12. The trailing arm 112 is rigidly connected near its second end to a conventional axle 22 to which wheels 16 (shown in outline) are connected at opposite ends of the axle 22. The axle 22 has an exterior axle surface 23. In a typical trailer application, the two identical trailing arm assemblies are used on either side of the trailer 14 to mount the axle 22 to the frame rail 12 and support opposing ends of the axle 22, as best illustrated in FIG. 2.

The trailing arm assembly 10 comprises a conventional hanger bracket 18 rigidly connected, such as by bolts (not shown), to the trailer frame rail 12 (shown in outline). The trailing arm 112 is resiliently and pivotably connected at the proximal end 15 to the hanger bracket 18 through a resilient bushing 52 that provides for deflection of the trailing arm 112 relative to the hanger bracket 18 that is a different magnitude along the longitudinal axis of the trailing arm 112 than along the axis of the hanger bracket 18. The air spring 24 is mounted between the distal end 17 of the trailing arm 112 and the trailer frame rail 12 in a conventional manner, such as with bolted connections (not shown). Alternatively, the air spring 24 can be mounted between a central portion of the trailing arm 112 and the trailer frame rail 12 with the axle 22 mounted at the distal end 17 of the trailing arm 112.

A shock absorber assembly 28 is preferably mounted between the trailing arm 112 and the second crossbeam 19 of the trailer frame 11. In the illustrated example, the shock absorber assembly 28 comprises shock absorber 48 mounted at a first end 20 through a shock absorber bracket 44 to the second crossbeam 19 and at a second end 21 through a shock absorber clevis 46 (FIGS. 13 and 14) to the trailing arm 112. The clevis 46 is fixedly connected to the trailing arm 112 via welding and the like, as described below.

The trailing arm assembly 10 can also be selectively provided with a conventional drum brake actuator assembly 26 comprising a brake actuator 30 and an S-cam assembly 38. The brake actuator assembly 26 can be mounted to the axle 22 through appropriate brackets attached thereto, such as by welding. Alternatively, the brake actuator assembly 26 can be mounted to the trailing beam 112, thereby eliminating the axle welds. The suspension assembly may further be provided with a conventional disc brake assembly and disc brakes, rather than drum brakes.

The trailing arm 112 is preferably fabricated using generally conventional casting methods. The configuration of the trailing arm 112 is precisely determined, preferably by finite element analysis, accordingly to the design stresses to which the trailing arm 112 will be subjected at every point in the trailing arm 112. Thus, excess material is eliminated, reducing weight and cost, and optimizing the beam's strength-to-weight ratio. The use of casting methods enables the trailing arm 112 to be readily fabricated having the precisely-determined dimensions established from the design process. However, other fabrication methods can be utilized that will provide a beam having a variable cross section corresponding closely to the dimensions established during the design process to maintain the optimized strength-to-weight ratio.

Figure 8:
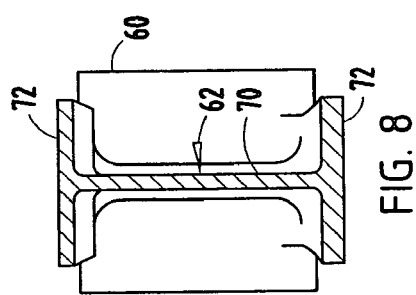
FIG. 8 is a cross-sectional view of the trailing arm, taken along line VIII-VIII, FIG. 5.

The trailing arm 112 (FIGS. 3-6) is a rigid, generally elongated member having a proximal end 15 and a distal end 17, and a longitudinal axis 34 (FIG. 6). The proximal end 15 comprises a hollow cylindrical bushing sleeve 60 having a bushing aperture 68 and defining a central axis 36 orthogonal to the longitudinal axis 34. The distal end 17 comprises an air spring seat 64 and an axle seat 66 adapted for rigid connection of the axle 22, as described below. Intermediate the proximal end 15 and the distal end 17, the trailing arm 112 has an I-beam section 62 (FIG. 8) comprising a web 70, an upper beam flange 72, and a lower beam flange 74. The plane of the web 70 is generally orthogonal to the central axis 36 of the bushing aperture 68 and coplanar with the longitudinal axis 34 of the trailing arm 112.

In the illustrated example, the upper flange 72 extends laterally an equal distance on either side of the web 70 and orthogonally thereto. However, the flange 72 can extend beyond the web 70 an unequal distance to accommodate the stresses in the flange, or due to other considerations such as providing clearance to accommodate other suspension components or the incorporation of mounting structures. As best illustrated in FIG. 6, the upper flange 72 varies in thickness along the length of the trailing arm 112 generally increasing in thickness from the bushing sleeve 60 to the air spring seat 64. The width of the upper flange 72 may also vary depending upon the variation in design stresses along the flange and the size of the trailing arm 112.

The lower flange 74 of the illustrated example also extends laterally an equal distance on either side of the web 70 and orthogonally thereto, although the flange 74 can extend beyond the web 70 an unequal distance as discussed above. As best illustrated in FIG. 5, the lower flange 74 varies in thickness along the trailing arm 112, generally increasing in thickness from the bushing sleeve 60 to the axle seat 66. The flange thickness will be dependent upon the variation in design stresses along the flange and the size of the trailing arm.

The air spring seat 64 (FIGS. 3-6, 9 and 11) is a generally platelike extension of the upper beam flange 72 and extends laterally beyond the upper flange 72 to provide a suitable seat for mounting and support of the air spring 24. The air spring seat 64 is integrally formed within the upper flange 72 extending above a lower portion thereof and integrally connected via a bride portion 152 extending in a generally upwardly-inclined direction from the rear welding stud 82 and the air spring seat 64 is an air spring seat reinforcing flange 106, as shown in FIG. 5. As shown in FIGS. 4 and 6, the reinforcing flange 106 is a generally platelike structure with a thickness approximately equal to that of the flanges 72, 74. The air spring seat reinforcing flange 106 is integrally formed with the beam web 70 and preferably extends an equal distance laterally of the beam longitudinal axis 34. However, the flange 106 can extend beyond the axis 34 an unequal distance to accommodate the actual stresses to which the flange 106 will be subjected, or due to the other considerations such as providing clearance to accommodate other suspension components or the incorporation of other mounting structures. The air spring seat 64 is provided with a plurality of mounting apertures 154 for mounting the air spring 24 to the trailing arm 112 using conventional fasteners, such as bolted connections (not shown). In the illustrated example, the air spring 24 includes an upper plate 156, a lower plate 158, and a flexibly resilient boot 160 extending therebetween as is known in the art. During periods of operation, the supply of air pressure to the air spring 24 may be reduced or eliminated, thereby allowing the boot 160 to roll about the edges of the lower plate 158 and extend below the lower plate 158. The elevated position of the air spring seat 64 with respect to the rest of the upper beam flange 72 provides a clearance area between the boot 160 and the trailing arm 112, thereby reducing wear of the boot 160 and increasing the operating life thereof.

Figure 7:
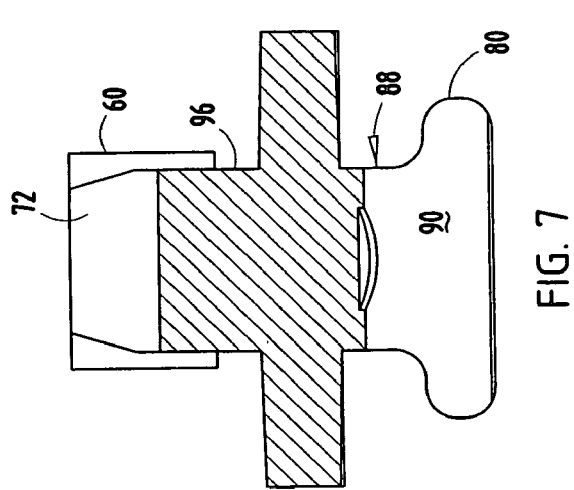
FIG. 7 is a cross-sectional view of the trailing arm, taken along line VII-VII, FIG. 5.
Figure 9:
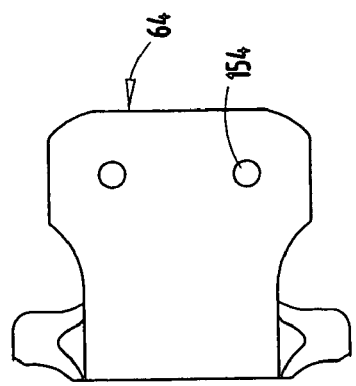
FIG. 9 is a cross-sectional view of the trailing arm, taken along the line IX-IX, FIG. 5.

The axle seat 66 is formed in the distal end 17 of the trailing arm 112 and is adapted to conform to the axle surface 23. The axle seat 66 comprises a front welding stud 80, a rear welding stud 82, and an axle saddle 88 (FIG. 7). The front welding stud 80 is an elongated, generally rodlike member preferably extending laterally an equal distance on either side of the beam longitudinal axis 34. However, the stud 80 can extend beyond the axis 34 an unequal distance to accommodate the actual stresses to which the stud 80 will be subjected. The rear welding stud 82 is an elongated, generally rodlike member preferably extending laterally an equal distance on either side of the trailing arm 112 longitudinal axis 34. However, the stud 82 can extend beyond the axis 34 an unequal distance to accommodate the actual stresses to which the stud 82 will be subjected. The front welding stud 80 is fabricated as a lateral extension of the lower flange 74 to provide structural, stress-transferring continuity between the stud 80 and the flange 74.

The axle saddle 88 is a generally arcuate, saddle-like structure preferably extending laterally an equal distance on either side of the beam longitudinal axis 34. However, the saddle 88 can extend beyond the axis 34 an unequal distance to accommodate the actual stresses to which the saddle 88 will be subjected. The axle saddle 88 has an axle saddle contact surface 90 with a curvature somewhat greater than the curvature of the axle surface 23. Preferably, the contact surface 90 is cast, however, certain applications may require machining. The design process preferably utilizes the finite element analysis method in order to configure the length, width, and thickness of the axle saddle 88 to accommodate the stresses to which the axle saddle 88 will be subjected. In the embodiment shown in FIGS. 3-7, the width of the axle saddle 88 is approximately equal to the width of the upper beam flange 72. The axle saddle 88 preferably includes a cavity 162 recessed into the contact surface 90. In the illustrated example, the cavity 162 (FIGS. 12 and 13) is completely encapsulated and is provided a substantially circular shape, however, other geometrical configurations may be utilized. In operation, stress is concentrated on the axle 22 at locations proximate the connections between the trailing arms 112 and the axle 22 by preventing the axle 22 from bending as compared to the locations along the length of the axle 22 not connecting with the trailing arms 112. The cavity 162 reduces the localized stress proximate the connection points between the trailing arms 112 and the axle 22.

An axle saddle stiffening rib 96 (FIG. 13) extends between the axle saddle 88 and the upper flange 72. The stiffening rib 96 extends generally the same distance laterally of the beam longitudinal axis 34 as the upper flange 72 and the axle saddle 88. A shock support tang 164 (FIGS. 13-15) extends outwardly from and is integrally molded with the saddle stiffening rib 96. The tang 164 includes a substantially rectangular mounting portion 166 having a mounting surface 168, and a structural reinforcement flange 170 formed integrally with the mounting portion 166. In assembly, the shock absorber clevis 46 is attached to the mounting surface 168 via welding, mounting hardware, or other suitable method.

As best illustrated in FIG. 13, the axle seat 66 engages the axle 22 so that the axle surface 23 is in contact with the axle saddle contact surface 90. A rear weld 79 extends around the perimeter of the welding stud 82 along the interface of the welding stud 82 and the axle surface 23. A front weld 78 extends in a similar manner around the perimeter of the welding stud 80 along the interface of the welding stud 80 and the axle surface 23. The axle 22 is rigidly connected to the beam 20 by the welds 78 and 79 that traverse the perimeter of each welding stud 80 and 82 respectively, along the interface of the welding studs 80 and 82 and the axle surface 23. With a curvature of the axle saddle 88 somewhat greater than the curvature of the axle 22, the top of the axle 22 is in contact with the axle saddle 88 at its junction with the axle saddle stiffening rib 96. This provides for vertical load transfer directly from the axle 22 to the beam 112 without the vertical load being carried by the beam-to-axle welds.

Figure 10B:
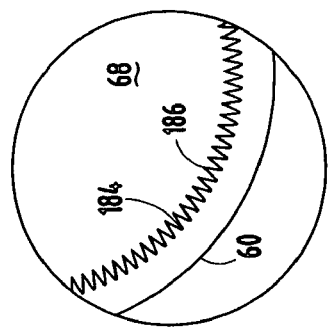
FIG. 10B is an enlarged, partial side view of a bearing sleeve of the trailing arm, taken of the area XB, FIG. 5.
Figure 10A:
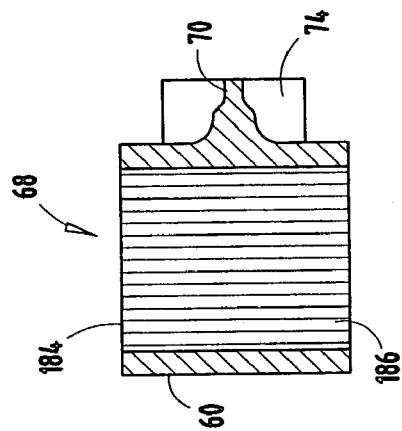
FIG. 10A is a cross-sectional view of the trailing arm, taken along the line XA-XA, FIG. 5.

The trailing arm 112 (FIG. 2) is connected to the hanger bracket 18 by slidably inserting a resilient bushing 52 into the bushing aperture 68 so that the bushing 52 frictionally engages an inner surface 184 of the aperture 68, and utilizing a conventional connection 54, such as a bolted fastener, for the pivotal connection between the trailing arm 112 and the hanger bracket 18. The trailing arm 112 can pivot about the axis 36, and the resilient bushing 52 enables the generally horizontal translation of the trailing arm 112 along its longitudinal axis 34 to differ in degree from its generally vertical translation orthogonal to the axis 34. The inner surface 184 (FIGS. 10A and 10B) of the bushing aperture 68 is preferably provided with a plurality of teeth 186, preferably with a height of within the range of from about 0.005 inches to about 0.010 inches, thereby limiting relative rotation between the bushing 52 and the trailing arm 112. It should be noted that the inner surface 184 may include out roughed surfaces so as to engage the bushing 52. The bushing aperture 68 (FIG. 16) is also preferably nonsymmetrical with respect to the pivot axis 36. In the illustrated example, the lateral distance A is less than the vertical distance B, thereby compressing a symmetrical bushing 52 more in the lateral direction than in the vertical direction. The greater compression in the lateral direction of the bushing 52 increases the spring rate in that direction, thereby altering the amount of lateral movement of the entire suspension system while leaving the amount of roll available relatively unchanged. It should be noted that the bushing aperture 68 may be provided in other geometrical configurations than as shown.

The proximate end 15 (FIGS. 6, 17A and 17B) of each trailing arm 112 is provided with abutment portion 170 surrounding each end of the bushing aperture 68. In operation, the trailing arm 112 is typically substantially parallel with each arm of the hanger bracket 18, as shown in FIG. 17A, thereby providing adequate clearance between the trailing arm 112 and the hanger bracket 18. However, turning the associated vehicle about corners and/or road conditions causing the supported trailer to sway may cause the trailing arms 112 to twist relative to the hanger brackets 18, as shown in FIG. 17B, thereby causing the trailing arm 112 to contact the hanger bracket at contact points 172. The increased thickness of the bushing sleeve 60 near the ends thereof provide an increased wear surface, thereby increasing the time between required service, while limiting the total weight of the trailing arm 112 that would be associated with increasing the thickness of the bushing sleeve 60 along the entire length thereof.

The suspension assembly 10 further includes a pair of spacer assemblies 180 (FIG. 18) each operably coupled to an associated trailing arm 112. Each spacer assembly 180 includes a rearward support member 182, a forward support member 185, a structural support member 187 and a spacer member 188. In the illustrated example, each of the members 182, 185, 187 and 188 comprise a plate-like structure. The members 182, 185 and 187 are welded to the trailing arm 112 or attached by another acceptable method, or alternatively, may be integrally formed with trailing arm 112. If constructed as separate pieces, the members 182, 185 and 187 may be attached to the trailing arm 112 either prior to or after connecting the axle 22 with the trailing arm 112. The spacer 188 is fixedly attached to the rearward support member 182 and the forward support member 185 subsequent to the axle 22 being attached to the trailing arm 112. The spacer member 188 is attached to the members 182 and 184 via welding, or other suitable method. Alternatively, the spacer member 188 may comprise a bolt, or other adjustable mechanism, that engages the support members 182 and 185. During operation, the trailing arm 112 absorbs an upwardly directed force at the contact point between the axle 22 and trailing arm 112, a downwardly directed force exerted by the hanger bracket 18 and a downwardly directed force exerted by the air spring 24. The combination of these forces may cause a slight bending in the trailing arm 112 about the contact point between the axle 22 and the trailing arm 112, thereby reducing the width of the axle saddle 88 and placing significant stress on the welds 78 and 79. The spacer assembly 180 bridges the open end of the axle saddle 88, thereby preventing or limiting bending of the trailing arm 112 and reducing the fatigue associated therewith.

As best illustrated in FIG. 16, the proximate end 15 of each trailing arm 112 is provided with a plurality of bushing removal/insertion tool engagement surfaces 190 each extending radially outward from the bushing sleeve 60 in a cantilevered manner. Each engagement surface 190 includes an aperture 192 extending therethrough for receiving a portion of the tool therein. The engagement surfaces 190 cooperate to increase the area available for engagement of the tool, as compared to a trailing arm that provides only an end surface of the bushing sleeve 60.

While the invention has been specifically described in connection with certain specific embodiments thereof, it is to be understood that this is by way of illustration and not of limitation. Reasonable variation and modification are possible within the scope of the foregoing disclosure and drawings without departing from the spirit of the invention, and the scope of the appended claims should be construed as broadly as the prior art will permit.

The invention claimed is:

1. A suspension system for suspending a vehicle frame above a plurality of ground-engaging wheels, comprising:
 a wheel-carrying axle comprising a first end and a second end;
 a pair of frame bracket assemblies each comprising a resiliently-bushed pivotable connection defining a pivot axis, the frame bracket assemblies operably coupled to opposite sides of the vehicle frame, the resiliently-bushed pivotable connection comprising a substantially cylindrically shaped bushing; and
 a pair of trailing arms each comprising a first end operably coupled to the first end and the second end of the axle, respectively, and a second end comprising an aperture that receives the bushing of one of the frame bracket assemblies therein, wherein the aperture of the second end of each trailing arm is oval-shaped, thereby causing a nonsymmetrical compression of the bushing about the pivot axis.

2. The suspension system of claim 1, wherein the aperture of the second end of each trailing arm is symmetrical with respect to a substantially horizontal plane.

3. The suspension system of claim 2, wherein the aperture is oriented so as to apply a greater compression in a substantially horizontal direction than in a substantially vertical direction.

4. A suspension system for suspending a vehicle frame above a plurality of ground-engaging wheels, comprising:
   a wheel-carrying axle comprising a first end and a second end;
   a pair of frame bracket assemblies each comprising a resiliently-bushed pivotable connection, the frame bracket assemblies operably coupled to opposite sides of the vehicle frame, the resiliently-bushed pivotable connection comprising an elastically deformable bushing; and
   a pair of trailing arms each comprising a first end operably coupled to the first end and the second end of the axle, respectively, and a second end comprising an aperture that receives the bushing of one of the frame bracket assemblies therein, the aperture defining an inner surface, wherein the inner surface is roughed.

5. The suspension system of claim 4, wherein the inner surface comprises a plurality of teeth.

6. A suspension system for suspending a vehicle frame above a plurality of ground-engaging wheels, comprising:
   a wheel-carrying axle comprising a first end and a second end;
   a pair of frame bracket assemblies each comprising a resiliently-bushed pivotable connection defining a pivot axis, the frame bracket assemblies operably coupled to opposite sides of the vehicle frame, the resiliently-bushed pivotable connection comprising a substantially cylindrically shaped bushing; and
   a pair of trailing arms each comprising a first end operably coupled to the first end and the second end of the axle, respectively, and a second end comprising an aperture that receives the bushing of one of the frame bracket assemblies therein, the second end of each trailing arm further comprising a lip extending radially outward from the aperture and at least one engagement surface extending radially outward from the lip and adapted to abut a bushing-removal tool.

7. The suspension system of claim 6, wherein each trailing arm comprises a single-cast piece.

8. The suspension system of claim 6, wherein the at least one engagement surface includes a first pair of engagement surfaces, and a second pair of engagement surfaces, wherein the first pair of engagement surfaces extending radially outward in a direction substantially towards the first end of the trailing arm, and wherein the second pair of engagement surfaces extend radially outward in a direction substantially away from the first end of the trailing arm.

9. The suspension system of claim 6, wherein each of the engagement surfaces includes an aperture extending therethrough.

10. A suspension system for suspending a vehicle frame above a plurality of ground-engaging wheels, comprising:
    a wheel-carrying axle comprising a first end and a second end;
    a pair of frame bracket assemblies each comprising a resiliently-bushed pivotable connection defining a pivot axis, the frame bracket assemblies operably coupled to opposite sides of the vehicle frame, the resiliently-bushed pivotable connection comprising a substantially cylindrically shaped bushing; and
    a pair of trailing arms each comprising a first end operably coupled to the first end and the second end of the axle, respectively, and a second end comprising an aperture that receives the bushing of one of the frame bracket assemblies therein, the second end of each trailing arm further comprising a cantilevered lip extending radially outward from the aperture wherein each trailing arm comprises a single-cast piece.

11. The suspension system of claim 10, wherein the aperture of the second end of each trailing arm is nonsymmetrical, thereby causing a nonsymmetrical compression of the bushing about the pivot axis.

12. The suspension system of claim 11, wherein the aperture of the second end of each trailing arm is parabolically shaped.

13. The suspension system of claim 12, wherein the aperture is oriented so as to apply a greater compression in a substantially horizontal direction than in a substantially vertical direction.

14. The suspension assembly of claim 11, wherein the aperture of the second end defines a nonuniform inner surface, thereby reducing rotation of the bushing with respect to the trailing arm.

15. The suspension system of claim 14, wherein the inner surface is roughed.

16. The suspension system of claim 15, wherein the inner surface comprises a plurality of teeth.

17. The suspension system of claim 14, wherein the second end of each trailing arm comprises a first thickness across a width thereof and a second thickness located proximate the frame bracket that is less than the first thickness.

18. The suspension system of claim 17, wherein the first end of each trailing arm comprises a mating surface operably coupled to the first and second ends of the axle, and wherein the mating surface of the first end of each of the trailing arms comprises a cavity, thereby reducing a localized stress transferred from the trailing arms to the axle.

19. The suspension system of claim 18, wherein each trailing arm further comprises a lip extending radially outward from the lip and is adapted to abut a bushing-removal tool.

* * * * *